United States Patent [19]
Bang

[11] Patent Number: 5,982,308
[45] Date of Patent: Nov. 9, 1999

[54] TECHNIQUE FOR COMPENSATION FOR MISSING PULSES WHEN DECODING GRAY CODE DATA IN HARD DISK DRIVE

[75] Inventor: Ho-Yul Bang, Kyungki-do, Rep. of Korea

[73] Assignee: SamSung Electronics Co., Ltd., Kyungki-do, Rep. of Korea

[21] Appl. No.: 08/946,063

[22] Filed: Oct. 7, 1997

[30]     Foreign Application Priority Data

Oct. 9, 1996 [KR] Rep. of Korea ....................... 96-44858

[51] Int. Cl.⁶ .............................. H03M 7/14; G11B 5/09
[52] U.S. Cl. ................................. 341/96; 360/51
[58] Field of Search ........................... 360/48, 51, 77.08, 360/40, 78.14; 341/96, 97, 98; 364/47

[56]     References Cited

U.S. PATENT DOCUMENTS

| | | | |
|---|---|---|---|
| 4,189,757 | 2/1980 | Kunstadt | 360/51 |
| 5,001,479 | 3/1991 | Becker et al. | 341/96 |
| 5,115,356 | 5/1992 | Silva | 360/51 |
| 5,353,175 | 10/1994 | Chiba | 360/51 |
| 5,381,281 | 1/1995 | Shrinkle et al. | 360/77.08 |
| 5,396,240 | 3/1995 | Schowe | 341/97 |
| 5,416,760 | 5/1995 | Masood et al. | 369/47 |
| 5,418,657 | 5/1995 | Machado et al. | 360/40 |
| 5,436,770 | 7/1995 | Muto et al. | 360/51 |
| 5,546,243 | 8/1996 | Setoyama | 360/51 |
| 5,617,536 | 4/1997 | Freitas et al. | 360/78.14 |
| 5,642,244 | 6/1997 | Okada et al. | 360/61 |
| 5,706,265 | 1/1998 | Bang | 369/50 |
| 5,757,567 | 5/1998 | Hetzler et al. | 360/49 |

*Primary Examiner*—Michael Tokar
*Assistant Examiner*—Patrick Wamsley
*Attorney, Agent, or Firm*—Robert E. Bushnell, Esq.

[57]     ABSTRACT

A decoding compensation circuit, which compensates for missing pulses when decoding the gray code written in a magnetic disk of a hard disk drive (HDD) includes: a central processing unit (CPU) for controlling the hard disk drive, a positive pulse detection window generator for generating a positive pulse detection window signal, a digital servo data generator for generating a digital servo data, a gray code detection window generator for generating a gray code detection window signal, a first logic gate circuit for logically processing the positive pulse detection window signal, digital servo data and gray code detection window signal so as to produce positive and negative pulse gray codes, a gray sync/data separation circuit for separating gray data and gray sync from the positive and negative pulse gray codes, a second logic gate circuit for logically processing the positive and negative gray data and sync to compensate for missing gray data and sync, a gray sync decision circuit for detecting the gray sync produced from the second logic gate circuit based on the positive pulse detection window signal so as to make a decision to produce an error flag which is transferred to the central processing unit, and a gray data decision circuit for detecting the gray data produced from the second logic gate circuit based on a positive pulse detection window signal to produce binary gray data which is transferred to the central processing unit.

6 Claims, 7 Drawing Sheets

FIG. 1 *(Related Art)*

TECHNIQUE FOR COMPENSATION FOR MISSING PULSES WHEN DECODING GRAY CODE DATA IN HARD DISK DRIVE

CLAIM OF PRIORITY

This application makes reference to, incorporates the same herein, and claims all benefits accruing under 35 U.S.C. §119 from an application for *CIRCUIT FOR COMPENSATING FOR MISSING PULSES WHEN DECODING THE GRAY CODE IN HARD DISK DRIVE AND METHOD THEREFOR* earlier filed in the Korean Industrial Property Office on the 9$^{th}$ of October 1996 and there duly assigned Serial No. 44858/1996.

BACKGROUND OF THE INVENTION

1. Field of the Invention

The present invention concerns a technique for detecting the servo data in a hard disk drive, and more particularly to a technique for decoding gray code data in a hard disk drive (HDD).

2. Description of the Related Art

Generally, a disk drive is used with either floppy or hard disks. Each disk surface is formatted by being divided concentrically into a number of circular recording tracks each of which is in turn subdivided into servo and data sectors. Servo sectors are areas on which servo information for reading and writing data onto object tracks is recorded according to corresponding servo patterns, and data sectors are areas on which data transferred from the host computer are recorded. A servo address mark (hereinafter sometimes referred to as a "SAM") representing the synchronization point of time is recorded on the start point of a servo sector. Usually, a unique pattern which is not used in servo and data sectors, is recorded in the servo address mark area. The servo address mark area is followed by a gray code area containing ID information for each of the tracks. The gray code area has the characteristic that the patterns are easily distinguished from each other and identified by changing pattern codes sequentially by only one bit. Lastly, a servo sector has a burst area which contains the "on track" information used for positioning the read/write head on the object track during track following or seek. The gray code area of the servo area is arranged in a specific format, which is, in turn, subdivided into a gray-sync area for providing sync signals, and a gray-data area with actual track information recorded thereon.

An earlier gray code detecting method is as follows. At first, the servo data recorded in the servo address mark and the gray code areas within the servo area are retrieved from the read/write channel to be digitized, and the digitized signal is supplied to the gray code decoding circuit. At this time, the gray code decoding circuit generates first a gray enable signal, and then a decoding edge signal synchronized with the positive going pulse edge of the gray code signal. Further being based on the gray enable signal the gray code decoding circuit generates a gray synchronization detection window signal and gray data detection window signals. Accordingly, when the falling edges of the decoding edge signals are detected within the respective detection windows, the gray synchronization and the gray data signals are read out.

The patent to Schowe, U.S. Pat. No. 5,396,240, entitled *Missing Pulse Generator For Gray Code Decoding*, is directed to different techniques, while the patents to Silva and Setoyama, U.S. Pat. Nos. 5,115,356 and 5,546,243, respectively entitled *Decoder Circuit With Missing Clock Generator*, and *Data And Synchronization Signal Outputting Apparatus For Recovering Missing Data And Synchronization Signals*, each disclose circuits for generating missing clock signals.

Other exemplars of the state of the art include U.S. Pat. No. 5,353,175 to Chiba, entitled *Apparatus For Signal Generators To Enable Detection Of Header Information Such As An Address Mark Sector Mark Or Address Information Recorded On Each Sector Of A Disc Recording Medium Only Where Such Information Could Be Present*, U.S. Pat. No. 5,416,760 to Masood et al., entitled *Recovery Of Data From Optical Data Disk Sectors Having Missing Or Defective Synchronization Information*, U.S. Pat. No. 5,436,770 to Muto et al., entitled *Disc Recording And/Or Reproducing Apparatus Having An Enlarged Locking Range For Correctly Phased Internal Channel Clocks*, U.S. Pat. No. 5,001,479 to Becker et al., entitled *Gray Code Converter With Error Signal*, U.S. Pat. No. 5,381,281 to Shrinkle et al., entitled *Disk Drive System Using Multiple Embedded Quadrature Servo Fields*, U.S. Pat. No. 5,617,536 to Freitas et al., entitled *Method And Apparatus For Servo Control With Error Detection Of Gray (Pennington) Code Used For Servo Track ID*, U.S. Pat. No. 5,418,657 to Machado et al., entitled *Track Address Detecting Means By HDD Sector Servo Method*, and U.S. Pat. No. 4,189,757 to Kunstadt, entitled *System For Decoding Data On A Magnetic Medium*.

I have found that when supplying the signals retrieved via the read/write channel to the gray code decoding circuit to be decoded, the above retrieved signals are very weak owing to the flying height of the head or noise, resulting in being often missed. Consequently, erroneous decoding edge signals are generated and accordingly, the falling edge of the decoding edge signal can not be detected within the gray sync and data detection window, resulting in a failure to read out the gray sync and data. This is a substantial cause of erroneous decoding of the gray code decoding circuit and is a drawback of the earlier gray code detecting method.

SUMMARY OF THE INVENTION

It is an object of the present invention to provide an improved decoding compensation process and circuit.

It is another object to provide a decoding compensation process and circuit for compensating for missing pulses when decoding the gray code data written in a magnetic disk of a hard disk drive.

It is still another object to provide a process and circuit able to minimize the occurrence of errors during decoding of gray code.

According to the present invention, a decoding compensation circuit comprises a central processing unit (CPU) for controlling a hard disk drive as well as for generating various initial values to detect the servo data and gray code in synchronism with the time of detecting the servo address mark (SAM), a positive pulse detection window generator for detecting the amplitude peak value of the hysteresis level of an analog signal read from the magnetic disk to generate a positive pulse detection window signal, a digital servo data generator for detecting the amplitude peak value of the hysteresis level of an analog signal read from the magnetic disk to generate a digital servo data, a gray code detection window generator for detecting the servo address mark from the digital servo data to generate a gray code detection window signal, a first logic gate circuit for logically processing the positive pulse detection window signal, digital servo data and gray code detection window signal so as to produce positive and negative pulse gray codes, a gray sync/data separation circuit for separating gray data and gray sync from the positive and negative pulse gray codes, a second logic gate circuit for logically processing the positive and negative gray data and sync to compensate for missing gray data and sync, a gray sync decision circuit for detecting the gray sync produced from the second logic gate circuit based on the positive pulse detection window signal so as to make a decision to produce an error flag transferred to the central processing unit, and a gray data decision circuit for detecting the gray data produced from the second logic gate circuit based on positive pulse detection window signal to produce a binary gray data transferred to the central processing unit.

The present invention will now be described more specifically with reference to the drawings attached only by way of example.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
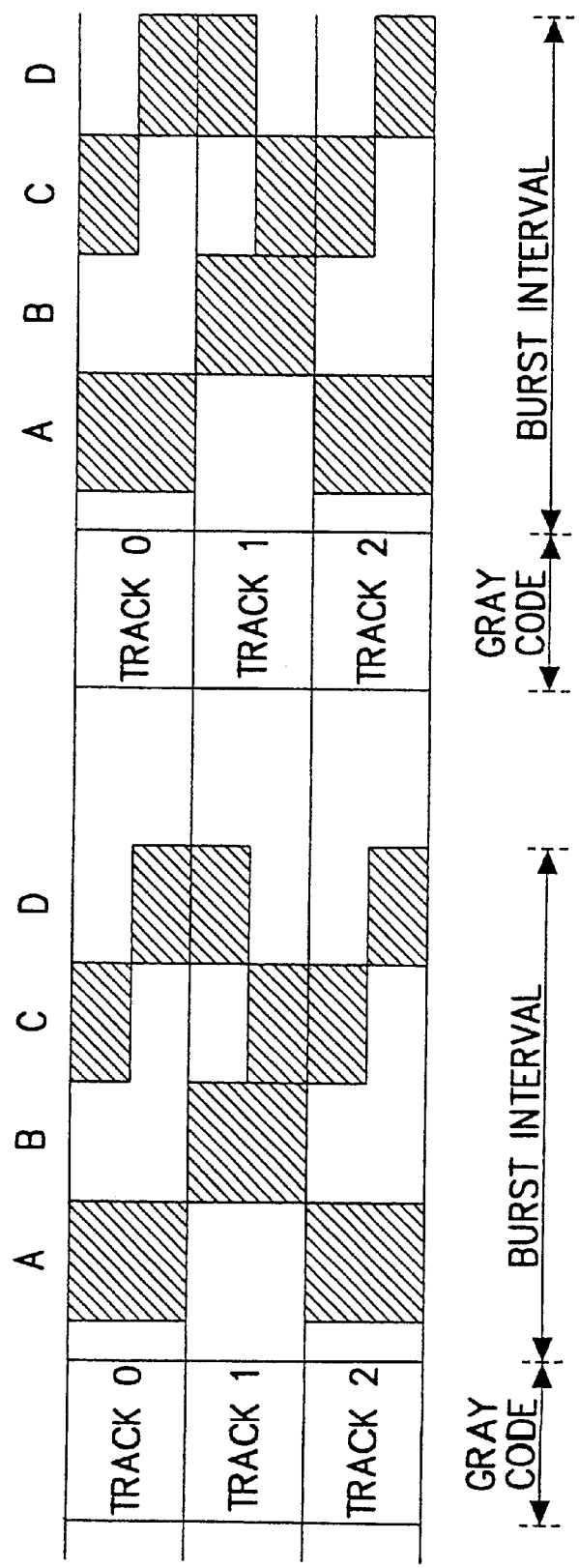
FIG. 1 is a descriptive format chart illustrating a format of the gray code and burst intervals of an earlier servo area.

FIG. 1 illustrates a specific format of the gray code area contained within the servo area as noted in the Description of the Related Art above.

Figure 2:
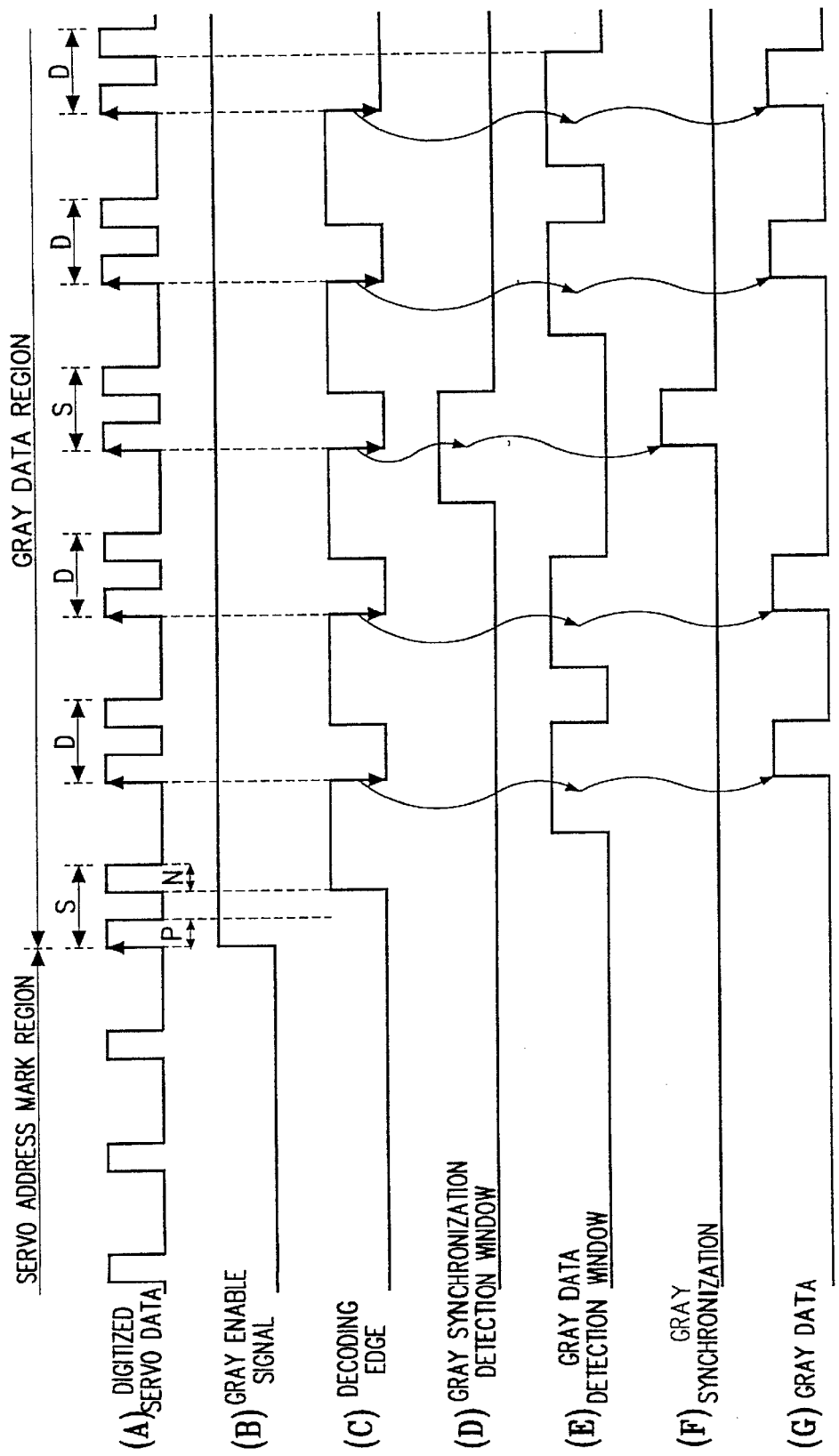
FIG. 2 is a detection timing chart for retrieving the gray synchronization/data recorded in the earlier gray code area.

FIG. 2 illustrates one of the earlier gray code detecting methods noted in the Description of the Related Art above. At first, the servo data recorded in the servo address mark and the gray code areas within the servo area are retrieved from the read/write channel to be digitized and the digitized signal is supplied to the gray code decoding circuit. The gray code decoding circuit first generates a gray enable signal having the waveform B and then a decoding edge signal having a waveform C of FIG. 2 synchronized with the positive going pulse edge of the gray code signal. The gray code decoding circuit generates a gray synchronization detection window signal having a waveform D of FIG. 2 and gray data detection window signals having a waveform E of FIG. 2. Accordingly, when the falling edges of the decoding edge signals are detected within the respective detection windows, the gray synchronization and the gray data signals are read out, respectively having the waveforms F and G of FIG. 2.

Figure 3:
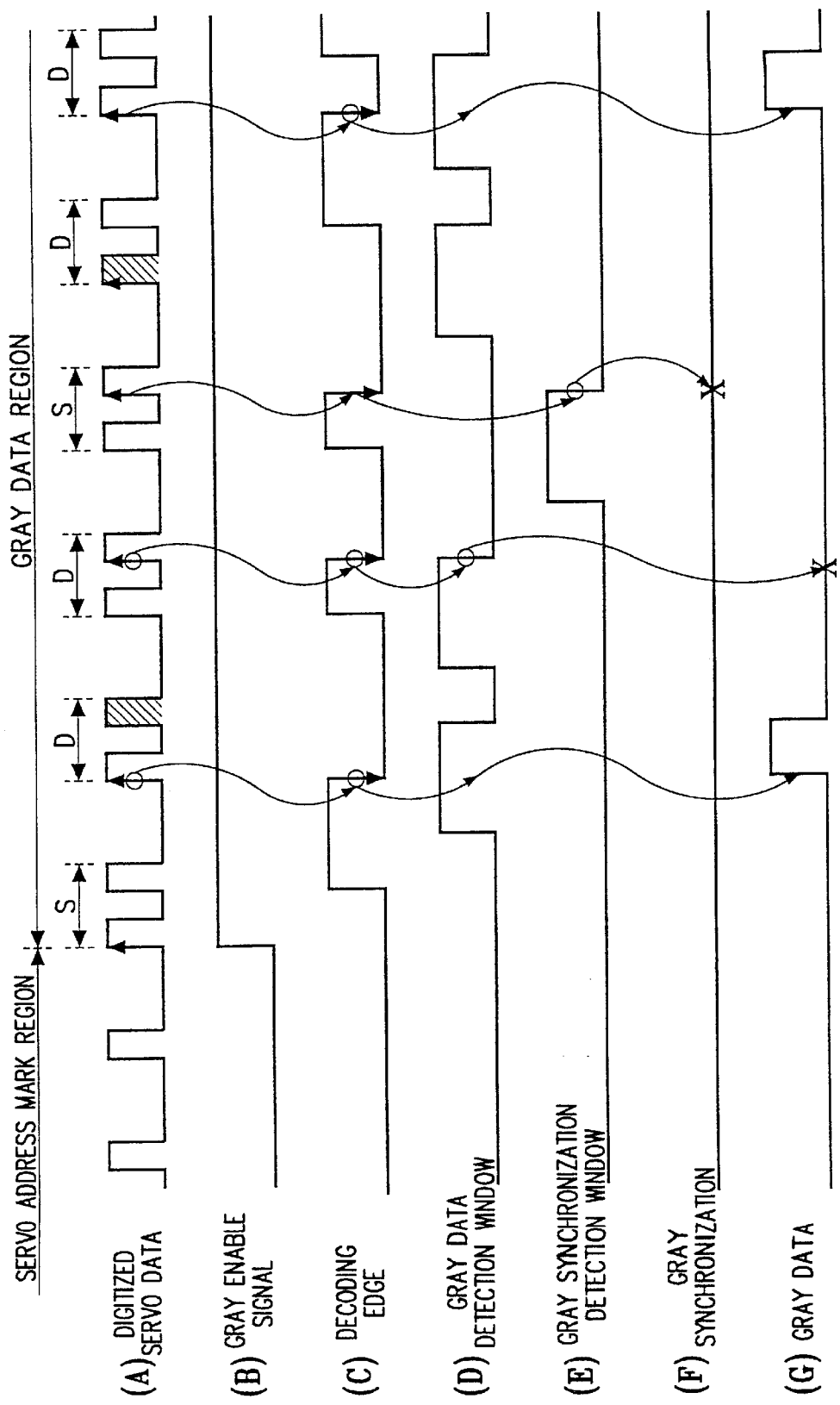
FIG. 3 is a timing chart illustrating the generation of missing pulse in the earlier gray code area.

As depicted in FIG. 3 however, when supplying the signals retrieved via the read/write channel to the gray code decoding circuit to be decoded, the above retrieved signals are often missed and consequently, erroneous decoding edge signals having the waveform C of FIG. 3 are generated and according, the falling edge of the decoding edge signal can not be detected within the gray sync/data detection window, resulting in a failure to read out the gray sync and data as shown in waveforms F and G of FIG. 3 which is the cause of the erroneous decoding of the gray code decoding circuit and is a drawback of the earlier gray code detecting method.

Figure 4:
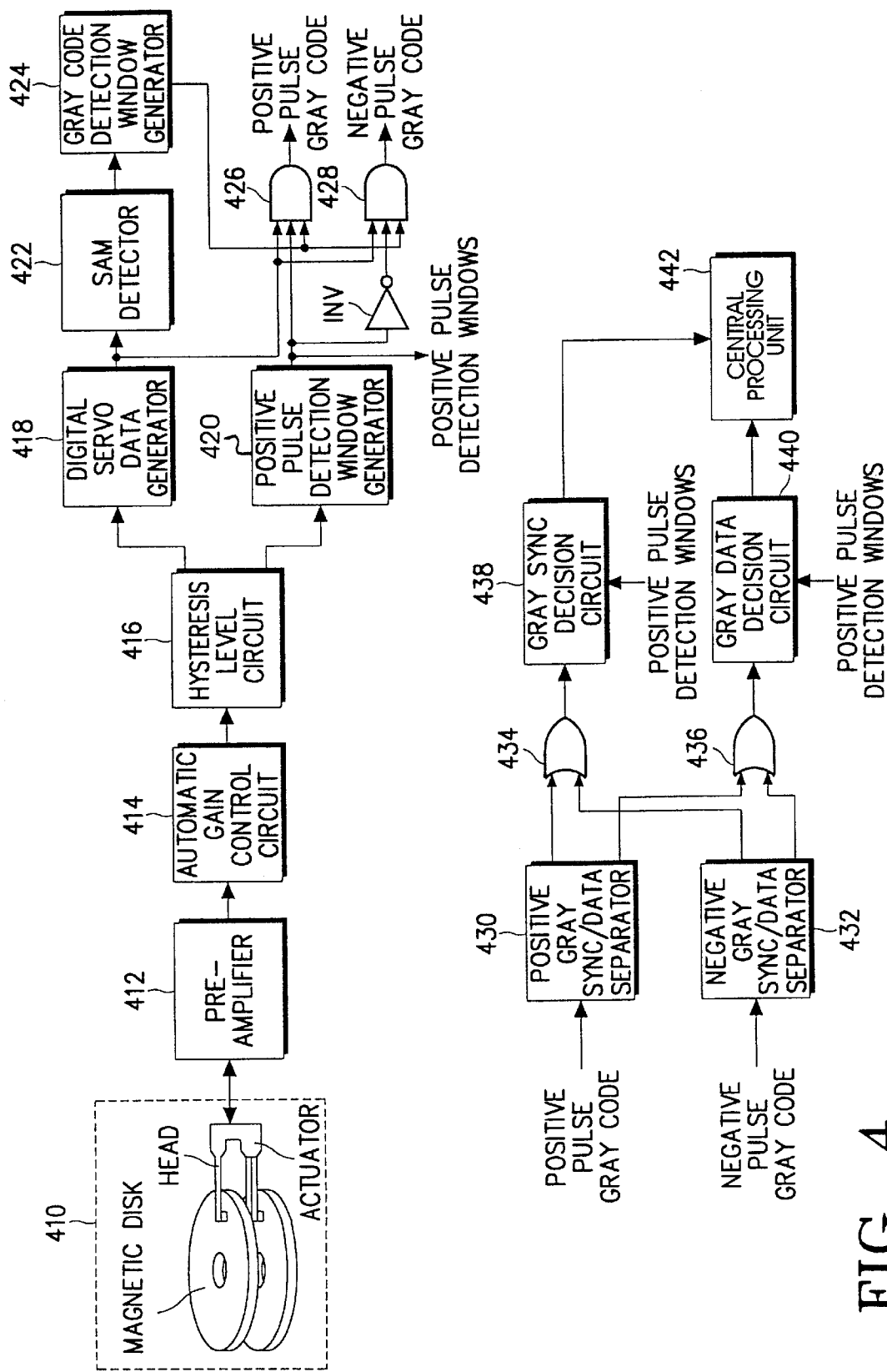
FIG. 4 is a constituent block diagram illustrating the gray code decoding compensation circuit of the HDD according to an embodiment of the present invention.

Referring to FIG. 4, the head disk assembly (HDA) 410 consists of heads for reading out and writing information from and onto the disks, and magnetic disks, comprising recording media, being rotated at a constant rate by a spindle motor (not showing). The data retrieved by the heads are supplied to a preamplifier 412 so as to be amplified, and automatically adjusted by an automatic gain control circuit 414 to be further supplied to a hysteresis level circuit 416. The hysteresis level circuit 416 delays the peak point of the data adjusted by automatic gain control circuit 414 so as to generate digitized servo data through a digital servo data generator 418, and enables a positive pulse detection window generator 420 to generate the positive pulse. Thereafter, servo address mark detector 422 detects the servo address mark from the servo area of the digital servo data received from the digital servo data generator 418 and enables the following gray code detection window generator 424, to generate the gray code enable signal. Besides, first AND gate 426 logically processes signals received from digital servo data generator 418, positive pulse detection window generator 420, and gray code detection window generator 424 respectively so as to produce the positive pulse gray code and to further transmit it to a positive gray sync/data separation circuit 430. Second AND gate 428 logically processes signals received from the digital servo data generator 418, the positive pulse detection window generator 424 and inverted signals received from the positive pulse detection window generator 420 to produce the negative pulse gray code, thereby further transmitting it to the negative gray sync/data separation circuit 432. The positive gray sync/data separation circuit 430 and the negative gray sync/data separation circuit 432 each separate gray sync and data and then logically process them through OR gates 434 and 436, thereby further supplying them to a gray sync decision circuit 438 and a gray data decision circuit 440 respectively. At this time, the gray data decision circuit 440 restores any of the missed "10" or "01" when missing any data of the above received positive and negative gray data to be further transmitted to a central processing unit CPU 442, and the gray sync decision circuit 438 transmits an error flag to CPU 442 when missing all of the positive and negative gray sync, i.e. in case of a state of "00".

The operation of the gray code decoding compensation circuit (as shown in FIG. 4) of the present invention is described in detail with reference to FIGS. 5, 6, and 7.

Figure 5:
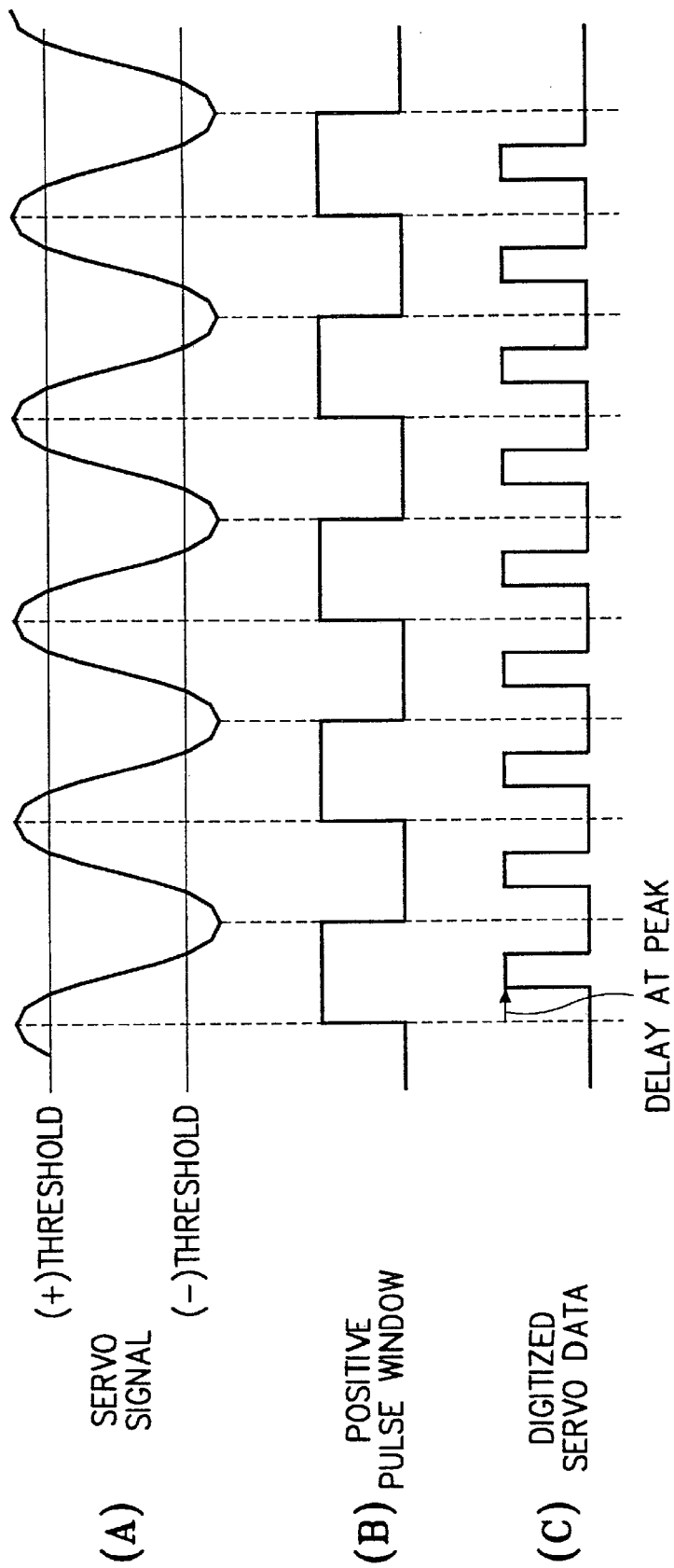
FIG. 5 is a timing chart illustrating the digitized servo data according to the embodiment of the present invention.

Referring to FIG. 5, the output signal adjusted by automatic gain control circuit 414 is supplied to hysteresis level circuit 416 with the waveform A, whereby a positive pulse window signal with the waveform B is generated from the amplitude peak value, and digitized servo data with the waveform C delayed from the amplitude peak value is produced.

Figure 6:
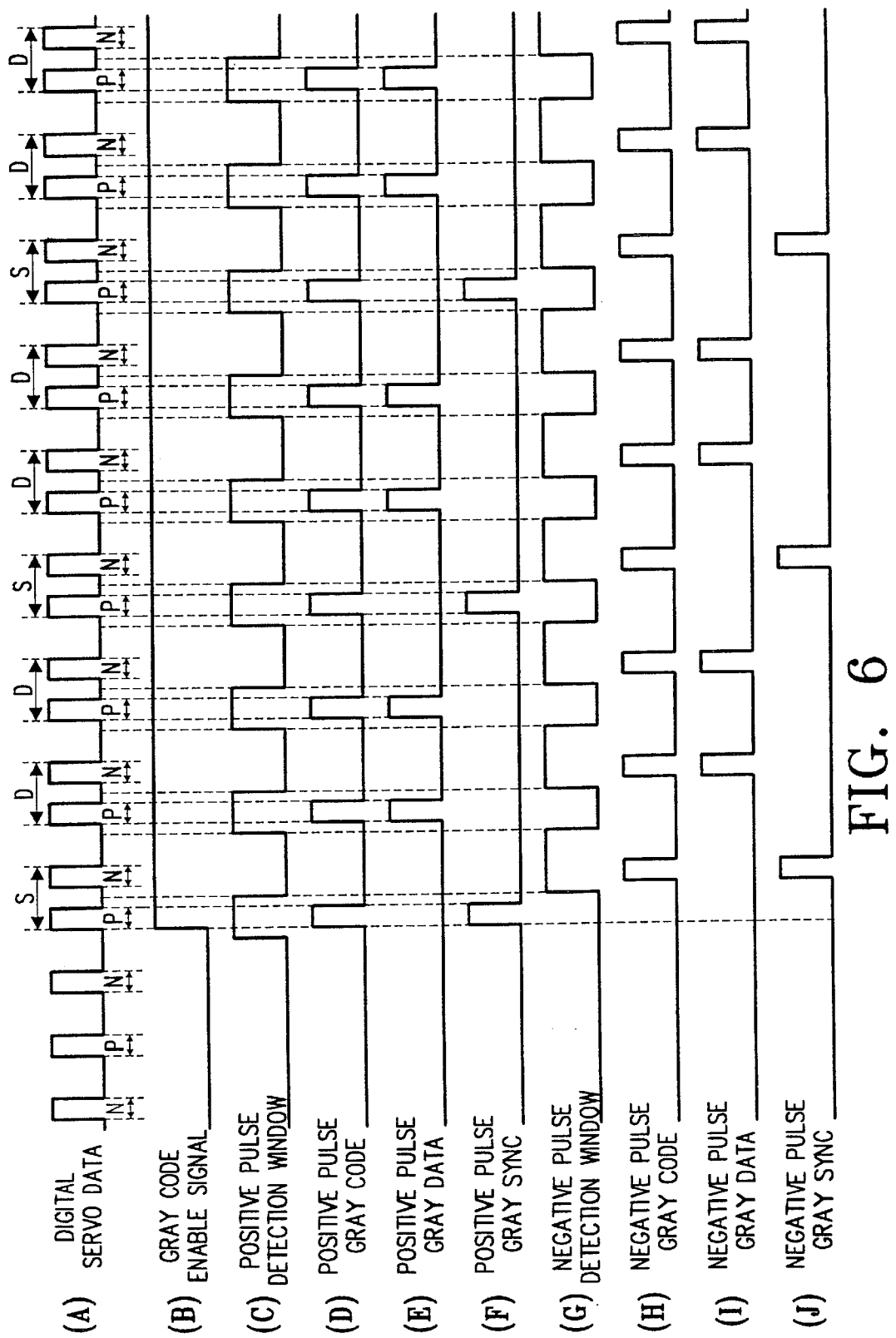
FIG. 6 is a timing chart illustrating the gray code decoding according to the embodiment of the present invention.

Referring to FIG. 6, the gray code enable signal having the waveform A is generated from a gray code detection window generator 424 so as to be supplied as first AND gate 426 and second AND gate 428 respectively, and for positive pulse detection window generator 420 generates the positive pulse detection window having the waveform C to be supplied as second input to the first AND gate 426, and generates a negative pulse detection window having the waveform G to supply it as a second input to a second AND gate 428, and lastly, the digital servo data generator 418 generates digitized servo data to supply it as the third input to first AND gate 426 and second AND gate 428. At this time, first AND gate 426 and second AND gate 428 each logically process three respective inputs, thereby generating positive and negative pulse gray codes each having waveforms D and H respectively. Thereafter, the above positive and negative gray codes are each supplied to positive and negative gray sync/data separator circuits 430 and 432 respectively, whereby gray data and sync are separated from the positive/negative gray codes. The positive pulse gray data has the waveform E, the positive pulse gray sync has the waveform F, the negative pulse gray data has the waveform I, and the negative pulse gray sync has the waveform J.

Thereafter, the separated positive and negative pulse gray data each having waveforms E and I are logically processed through OR gates 434 and 436 so as to be further supplied to a gray data decision circuit 440, which detects the final gray data based on the positive pulse detection window signal. Also the separated positive and negative pulse gray syncs each having respective waveforms F and J are logically processed through OR gates 434 and 436 so as to be further supplied to gray sync decision circuit 438, which detects the final gray sync based on the positive pulse detection window signal.

Figure 7:
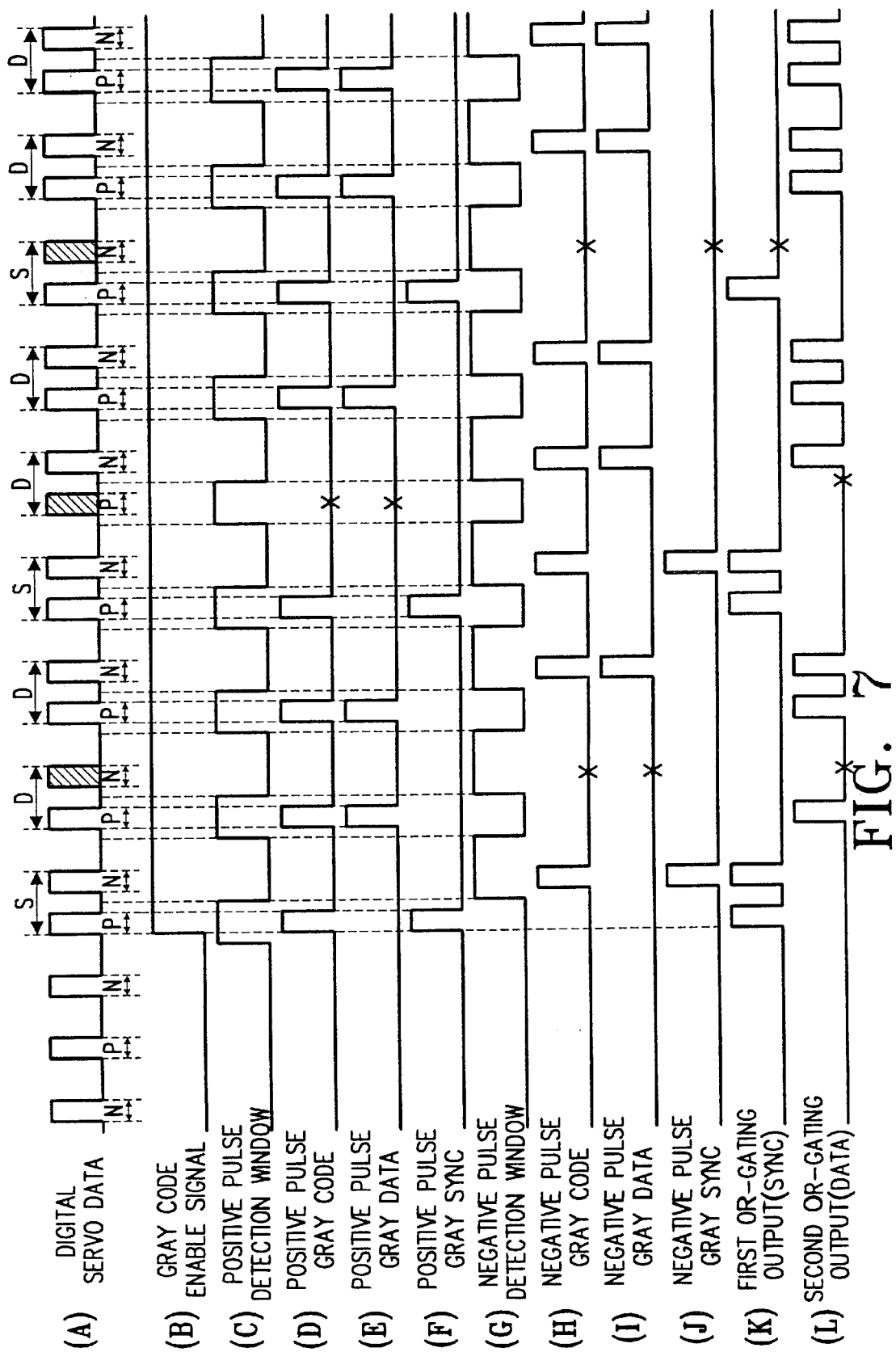
FIG. 7 is a timing chart illustrating the gray code decoding at the time of generation of the missing pulse in the gray code area according to the embodiment of the present invention.

Referring to FIG. 7, the method for compensating for missing pulses is explained in detail, assuming that the input signals supplied to the gray code decoding circuit are so weak that first and third gray data and the third gray sync signal are missed in the recorded area.

Firstly, the retrieved signal having waveform A is supplied to the gray code decoding circuit, and at the same time, the gray code detection window generator 424 is enabled, whereby the gray code enable signal is enabled in the waveform B, and also the positive pulse detection window generator 420 is enabled to generate respective positive and negative pulse detection windows. Therefore, the positive pulse of the gray data signal supplied with waveform A is detected within the positive pulse detection, and the negative pulse is detected within the negative pulse detection window, whereby gray codes each are supplied to respective positive/negative gray code separation circuits 430 and 432. However, as shown in the waveform A, when the negative pulse in first gray data is not detected within the negative pulse detection window, as shown in the waveform G, the retrieved signal is supplied in a missed pulse state to the negative gray sync/data separation circuit 432, and also when the positive pulse in third gray data is not detected within the positive pulse detection window, as shown in the waveform D, the retrieved signal is supplied in a missed pulse state to the negative gray sync/data separation circuit 430. Thereafter, the positive/negative gray codes supplied are each separated so as to be further transmitted as shown in waveforms E, F, I, J. The separated positive and negative gray sync signals having waveforms E and I are logically processed through OR gates so as to be transmitted as a signal showing waveform K. Therefore, if third negative gray sync signal is missed, it is compensated by third positive gray sync signal. Also the separated positive and negative signals having waveforms F and J are logically processed through OR gates so as to be further transmitted in waveform L. Therefore, if the first negative gray data signal is missed, it is compensated for by the first positive gray sync signal, and if the third positive gray data signal is missed, it is compensated for by the third negative gray data signal.

As mentioned above, the present invention provides a highly efficient gray code decoding method and a decoding compensation circuit for compensating for missing pulses when missing pulses are detected in the gray code area of servo area in which track information is recorded, which can considerably improve the stability and reliability of the servo detection.

What is claimed is:

1. A decoding compensation circuit for compensating for missing pulses when decoding gray code written in a magnetic disk of a hard disk drive, comprising:

a central processing unit for controlling said hard disk drive as well as generating various initial values to detect servo data and gray code in synchronism with the time of detecting a servo address mark;

a positive pulse detection window generator for generating a positive pulse detection window signal by detecting a peak amplitude value of a hysteresis level of an analog signal read from said magnetic disk;

a digital servo data generator for detecting the peak amplitude value of the hysteresis level of an analog signal read from said magnetic disk to generate digital servo data;

a gray code detection window generator for detecting said servo address mark from said digital servo data to generate a gray code detection window signal;

a first logic gate circuit for receiving said positive pulse detection window signal, digital servo data and gray code detection window signal so as to produce positive and negative pulse gray codes;

a gray sync/data separation circuit for separating gray data and gray sync from said positive and negative pulse gray codes;

a second logic gate circuit for receiving the positive and negative gray data and sync to compensate for missing gray data and sync;

a gray sync decision circuit for detecting the gray sync produced from said second logic gate circuit based on said positive pulse detection window signal so as to make a decision to produce an error flag which is transferred to said central processing unit; and a gray data decision circuit for detecting the gray data produced from said second logic gate circuit based on positive pulse detection window signal to produce binary gray data which is transferred to said central processing unit.

2. A decoding compensation circuit as defined in claim 1, said first logic gate circuit comprising: a first AND gate for logically ANDing said positive pulse detection window signal, digital servo data and gray code detection window signal so as to produce the positive pulse gray code, and a second AND gate for logically ANDing said digital servo data, gray code detection window signal and a negative pulse detection window signal obtained by inverting said positive pulse detection window so as to produce the negative pulse gray code.

3. A decoding compensation circuit as defined in claim 1, said second logic gate circuit comprising: a first OR gate for logically ORing said positive and negative gray data, and a second OR gate for logically ORing said positive and negative gray sync.

4. A method of compensating for missing pulses when decoding gray code written in a magnetic disk of a hard disk drive with a central processing unit, which controls said a hard disk drive as well as generating various initial values to detect servo data and gray code in synchronism with the time of detecting a servo address mark, comprising the steps of:

detecting a peak amplitude value of the hysteresis level of an analog signal read from said magnetic disk to generate a positive pulse detection window signal;

detecting the peak amplitude value of the hysteresis level of an analog signal read from said magnetic disk to generate digital servo data;

detecting said servo address mark from said digital servo data to generate a gray code detection window signal;

logically combining said positive pulse detection window signal, digital servo data and gray code detection window signal with a first logic gate circuit so as to produce positive and negative pulse gray codes;

separating gray data and gray sync from said positive and negative pulse gray codes;

logically combining the positive and negative gray data and sync with a second logic gate circuit to compensate for missing gray data and sync;

detecting the gray sync produced from said second logic gate circuit based on said positive pulse detection window signal so as to make a decision to produce an error flag which is transferred to said central processing unit; and detecting the gray data produced from said second logic gate circuit based on positive pulse detection window signal to produce binary gray data transferred to said central processing unit.

5. A method as defined in claim 4, the step of logically combining with said first logic gate circuit further comprising the steps of:

ANDing said positive pulse detection window signal, digital servo data and gray code detection window signal with a first AND gate so as to produce a positive pulse gray code; and ANDing said digital servo data, gray code detection window signal and the negative pulse detection window signal obtained by inverting said positive pulse detection window with a second AND gate so as to produce a negative pulse gray code.

6. A method as defined in claim 4, the steps of logically combining with said second logic gate circuit further comprises the steps of:

ORing said positive and negative gray data with a first OR gate; and

ORing said positive and negative gray sync with a second OR gate.

* * * * *